US008239499B2

(12) United States Patent
Kwon (10) Patent No.: US 8,239,499 B2
(45) Date of Patent: Aug. 7, 2012

(54) ONLINE SOCIAL NETWORK MANAGEMENT SYSTEM AND METHOD FOR SIMULATING USERS TO BUILD VARIOUS FACES OF RELATION

(75) Inventor: Oh Sung Kwon, Seoul (KR)

(73) Assignee: NHN Corporation, Seongnam-si (KR)

( * ) Notice: Subject to any disclaimer, the term of this patent is extended or adjusted under 35 U.S.C. 154(b) by 497 days.

(21) Appl. No.: 11/817,568

(22) PCT Filed: Mar. 15, 2006

(86) PCT No.: PCT/KR2006/000936
§ 371 (c)(1),
(2), (4) Date: Aug. 31, 2007

(87) PCT Pub. No.: WO2006/098588
PCT Pub. Date: Sep. 21, 2006

(65) Prior Publication Data
US 2008/0288612 A1     Nov. 20, 2008

(30) Foreign Application Priority Data

Mar. 15, 2005   (KR) ........................ 10-2005-0021274

(51) Int. Cl.
*G06F 15/16* (2006.01)
*G06Q 99/00* (2006.01)
*G06Q 30/00* (2012.01)
(52) U.S. Cl. ........ 709/220; 709/204; 709/217; 709/227; 705/14.1; 705/319
(58) Field of Classification Search .......... 709/220–222, 709/223, 217; 707/100–104.1; 715/700–759
See application file for complete search history.

(56) References Cited

U.S. PATENT DOCUMENTS

| 6,775,267 B1 * | 8/2004 | Kung et al. ................... 370/352 |
| 7,366,759 B2 * | 4/2008 | Trevithick et al. ............ 709/206 |
| 7,472,110 B2 * | 12/2008 | Achlioptas ............ 707/E17.109 |
| 7,716,140 B1 * | 5/2010 | Nielsen et al. ................ 705/319 |
| 7,818,394 B1 * | 10/2010 | Lawler et al. ................. 709/217 |
| 7,949,611 B1 * | 5/2011 | Nielsen et al. ................ 705/319 |
| 7,970,712 B2 * | 6/2011 | Ruvolo et al. ................. 705/319 |
| 2003/0065580 A1 * | 4/2003 | Obata et al. ..................... 705/26 |

(Continued)

FOREIGN PATENT DOCUMENTS
KR    10-2001-0044692      6/2001
(Continued)

*Primary Examiner* — Ian N Moore
*Assistant Examiner* — Jenee Alexander
(74) *Attorney, Agent, or Firm* — H.C. Park & Associates, PLC (57) ABSTRACT

A system and method of managing a social network are disclosed. The method includes the step of recording the IDs and corresponding personal information of users who have subscribed to a service via a network, in a user DB; the step of recording corresponding relationships between the users and relationship indices R, reflecting the degrees of trustworthiness of the users having the corresponding relationships, in a relationship information DB; and the path search step of evaluating one or more paths based on the relationship indices R of respective links constituting the paths and providing evaluation results to a first user so that the first user can select an optimal path from among the paths existing between the first user and a second user on the social network constructed with the users used as nodes and the corresponding relationships of the users used as the links.

17 Claims, 11 Drawing Sheets

U.S. PATENT DOCUMENTS

| | | | |
|---|---|---|---|
| 2003/0097297 A1* | 5/2003 | Cavarretta et al. | 705/14 |
| 2003/0167324 A1* | 9/2003 | Farnham et al. | 709/224 |
| 2004/0122803 A1* | 6/2004 | Dom et al. | 707/3 |
| 2004/0148275 A1* | 7/2004 | Achlioptas | 707/3 |

FOREIGN PATENT DOCUMENTS

| | | |
|---|---|---|
| KR | 10-2002-0061119 | 7/2002 |
| KR | 10-2004-0082145 | 9/2004 |
| KR | 10-2005-0033995 | 4/2005 |

* cited by examiner

Fig. 1

PRIOR ART

Fig. 3

PRIOR ART

Fig. 12 if $R_{i-j} = 0 \rightarrow C(i,j) = 0$

ONLINE SOCIAL NETWORK MANAGEMENT SYSTEM AND METHOD FOR SIMULATING USERS TO BUILD VARIOUS FACES OF RELATION

CROSS REFERENCE TO RELATED APPLICATIONS

This application is a U.S. National Phase Application of International Application PCT Application No. PCT/KR006/000936 filed on Mar. 15, 2006, which claims the benefit of priority from Korean Patent Application No. 10-2005-0021274 filed on Mar. 15, 2005. The disclosures of International Application PCT Application No. PCT/KR2006/000936 and Korean Patent Application No. 10-2005-0021274 are incorporated herein by reference.

TECHNICAL FIELD

The present invention relates, in general, to a system and method for constructing and managing a social network via a network such as the Internet, and, more particularly, to a method and system that allow users to establish online acquaintance relationships with various counterparts at various levels via a network, and provide an environment for finding an optimal path for the establishment of a new corresponding relationship in consideration of set relationship indices, thus promoting the construction of an efficient online social network.

BACKGROUND ART

Networks, such as the wired/wireless Internet and intranets, have already been widely used as popularized communication means. The World Wide Web (WWW) and means, such as e-mail and messaging, that allow members of society to share information or obtain knowledge based on such networks have been actively utilized.

Recently, Internet service for enabling not only the use of a network simply as communication means but also the construction of an online social network using the network has been actively provided. The term "social network" refers to a virtual network based on individuals who have made acquaintance through social life. The term "acquaintance" refers to the range of persons who build trust therebetween to some degree as a result of sharing information, experience, ideas, and a sense of belonging to a community to some degree. Based on the aspects of general social life, such acquaintances are established by knowing each other through the extension of existing acquaintances, through blood relations, school relationships or neighborhood relationships, through belonging to specific organizations, or through the performance of collective work in a company or team.

Recently, due to the development and popularization of networks such as the Internet; the online establishment and management of such acquaintances has become possible. Various types of service technologies for supporting the active online construction of such social networks between users, organizing constructed social network into databases, enabling users to search for persons possessing desired capability and careers, or allowing users to establish online social network relationships with new acquaintances and to further extend their social networks, based on the databases, and enabling users to share various files or information have been proposed.

In the technologies for constructing and managing social networks online, the principal objectives of technical development in a corresponding field are to guarantee the trust of mutual human relationships in view of the characteristic of a network, such as the Internet, in which a number of anonymous persons can gain access to the network to construct social networks in wide ranges, and to minimize inconvenient procedures necessary to receive service.

Systems for constructing and managing social networks online, which are currently widely used, include two types: those which provide access to web servers of associations of like-minded persons, communities or the like and enable receipt of services, and those in which terminals are provided with application programs and receive service while communicating with servers.

Such a prior art system for constructing and managing a social network online is generally initiated in such a way that a user requests another person, who accesses a network to establish an online relationship via a means, such as e-mail, messaging, or a pop-up message, and the person, who receives the request, responds to the request. The 1:1 relationship between the two users, which is established as described above, is integrated into an online social network in which each user has established separate 1:1 relationships with other users. Due to the integration with the online social network it is possible to search for a desired person (for example, an alumnus or a person having a specific occupation) from among users who have made acquaintance directly with a user (first order acquaintance relationships) and among users who have first order acquaintance relationships with acquaintances and other users who have made acquaintance with the other users (n-th order acquaintance relationships), and to request the introduction of a found person or the establishment of a new acquaintance relationship therethrough.

Figure 1:
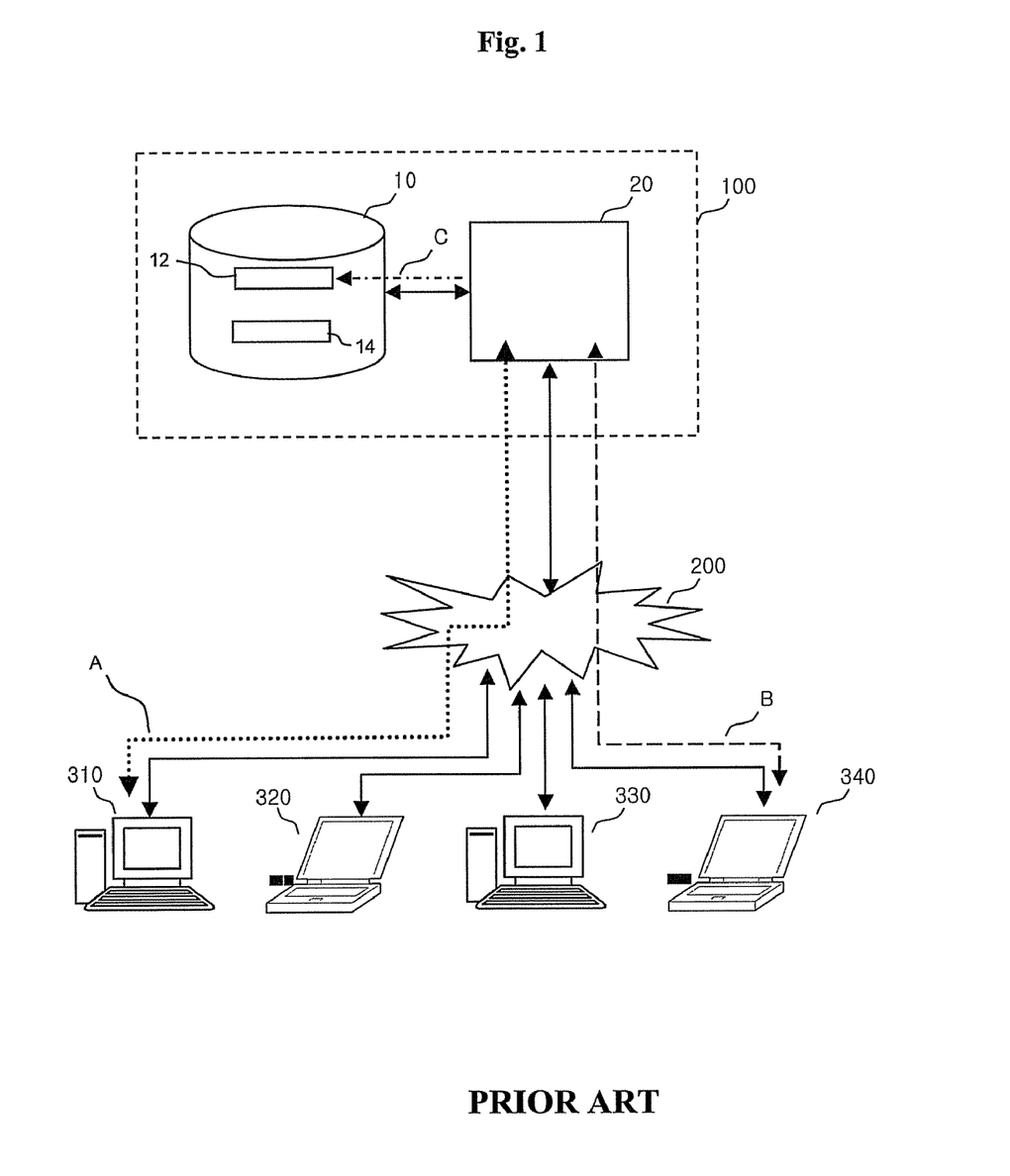
FIG. 1 illustrates a prior art social network search system 100.

FIG. 1 illustrates a prior art social network search system 100. The illustrated social network search system 100 is constructed to include a DataBase (DB) 10 and a search server 20. The DB 10 includes a user DB 12 and a relationship information DB 14. The social network search system 100 accesses a plurality of user trials 310, 320, 330 and 340 via networks 200, including the wired/wireless Internet and/or intranets. Although only four user terminals are illustrated for the purpose of convenience, the user terminals may be various fixed or mobile terminals, such as laptops, desktops, Personal Digital Assistants (PDAs), and Personal Communications Service (PCS) terminals.

In a user registration process, step A, at which a first user registers with the social network search system 100 via his or her terminal 310, is performed, and step B, at which a fourth user registers with the social network search system 100 via his or her terminal 340, is separately performed. In this registration process, the ID, password and personal information (occupation, gender, age, place of residence, company name, school and hobby) of each user may be input) and the user's information is converted into a predetermined data structure and stored (step C) and managed in the user DB 12. At the time of each user subscribing to and registering with service (steps A and B), the social network search system 100 may cause a specific application program, allowing users to easily use various functions, provided by the system, in conjunction with the search system to be downloaded to and executed on the respective user terminals.

Figure 2:
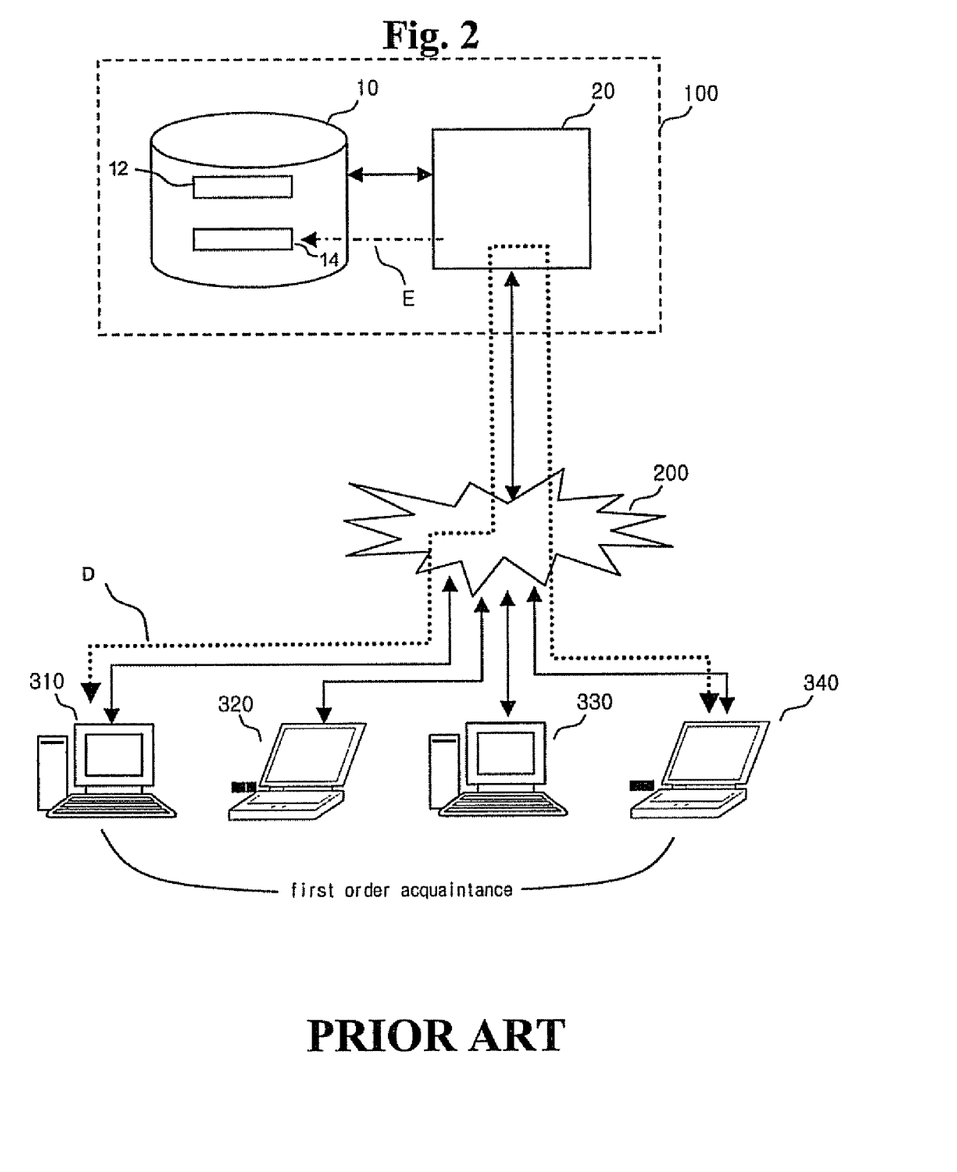
FIG. 2 illustrates the step of establishing a corresponding relationship between users (first order acquaintance relationship) in the prior art social network search system 100.

FIG. 2 illustrates the step of establishing a corresponding relationship between users (first order acquaintance relationship) in the prior art social network search system 100. Step D, at which, in order to establish a first order online acquaintance relationship between the users, the first user sends an invitation message to the second user's terminal 330 via his or her terminal 330, and the fourth user checks the invitation message and sends an acceptance message, can be performed. The invitation and acceptance messages may be in various forms, and the social network search system 100 becomes aware of the performance of the invitation and acceptance steps and records the establishment of a corresponding relationship between the two users in the relationship information DB 14 using a predetermined data structure (step E). In this case, the fourth user may be an unregistered user, in which case a step of inducing the user to register with the system through data transmission to and reception from the social network system 100 at the time of sending the approval message with respect to the invitation may be performed together with the other steps.

Figure 3:
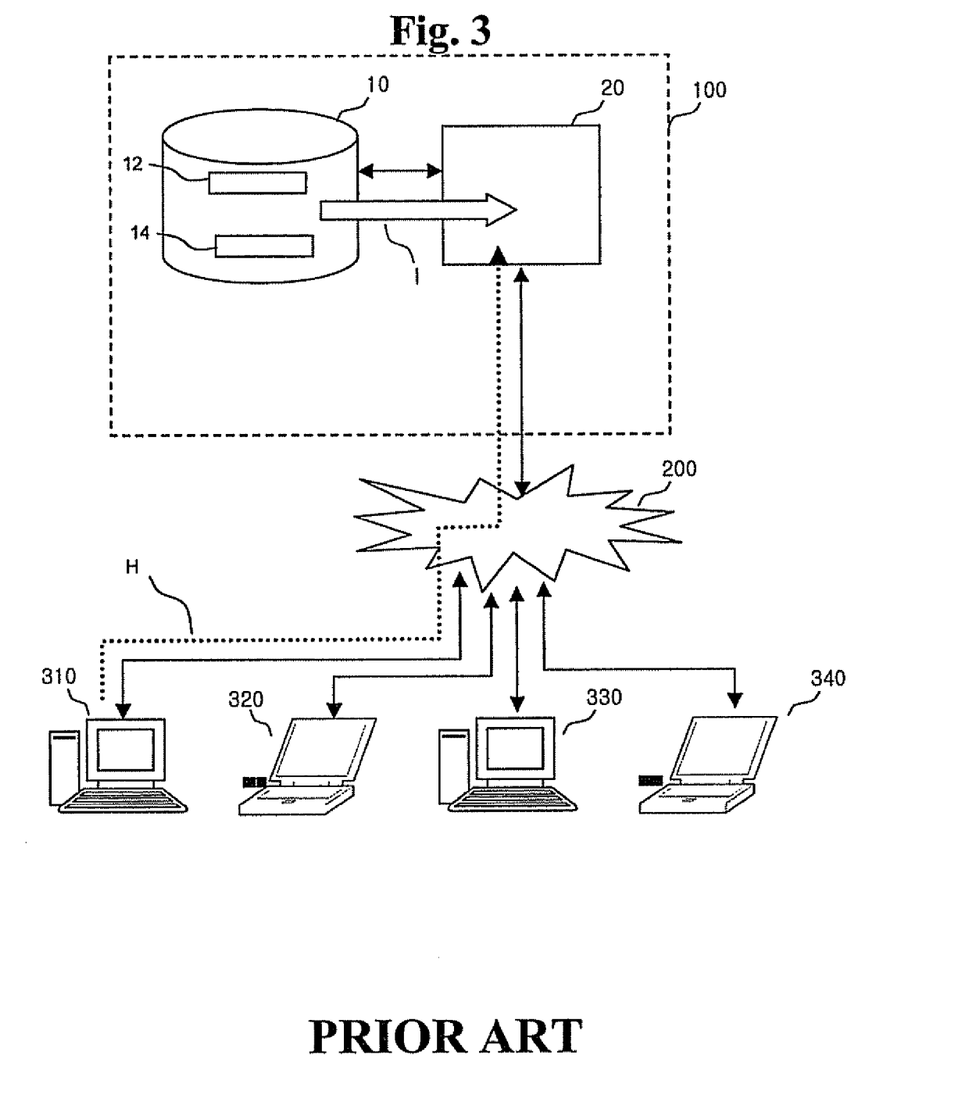
FIG. 3 illustrates the step of searching a social network in the prior art social network search system 100.

FIG. 3 illustrates the step of searching a social network in the prior art social network search system 100. When a request for specific condition setting and social network search is received via the first user's terminal 310 (step H), the search server 20 of the system 100 reads data recorded in the user DB 12 and the relationship information DB 14, converts the data, loads the converted data into a memory module provided in the search server 20 (step D), and conducts a search using the loaded data.

Figure 4:
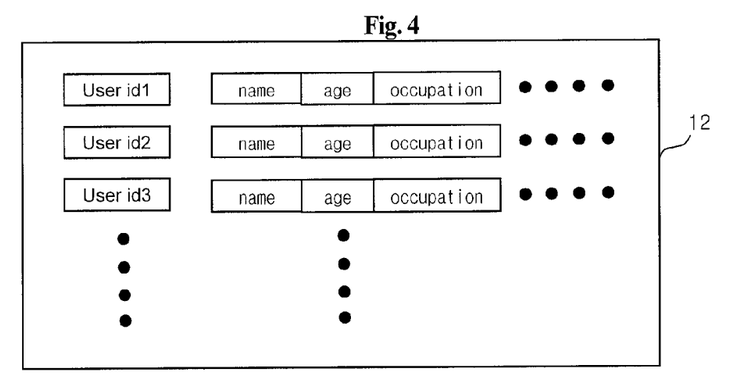
FIGS. 4 and 5 illustrate the data structures of a user DB 12 and a relationship information DB 14, respectively.
Figure 5:
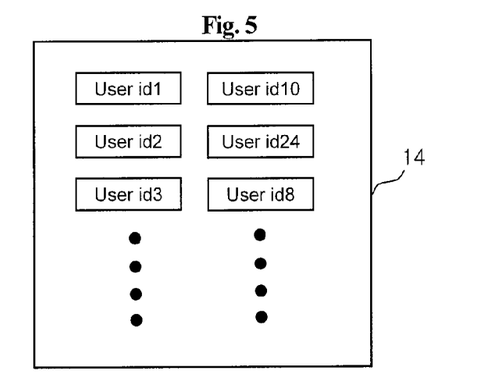

FIG. 4 illustrates the data structure of the user DB 12. As illustrate in the user DB 12, user information, such as the name, age, occupation and gender of each user, is stored in association with each user ID (Userid1, 2, 3, . . . ). FIG. 5 illustrates the data structure of the relationship information DB 14. As illustrated, in the relationship information DB 14, user IDs having a corresponding relationship (first order acquaintance relationship) are stored with a 1:1 relationship.

Figure 6:
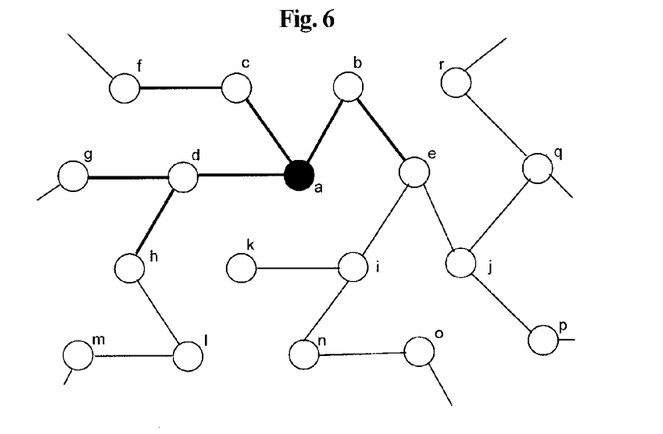
FIG. 6 is a schematic diagram illustrating an online social network search space.

FIG. 6 is a schematic diagram illustrating an online social network search space. In a vital social network search space, respective users who registered with a system correspond to respective nodes a, b, c, d, . . . . According to corresponding relationships between users, links or edges are formed between the nodes of the search space. The search space formed as described above may be represented using a graph data structure. In this search space, start node 'a' from which a search starts is defined. In the illustrated example, users within second order acquaintance relationships around the search start node 'a' are illustrated. When the user requests a search for a user who meets a specific condition (for example, a patent attorney) within second order acquaintance relationships, the search is performed within the illustrated range.

Figure 7:
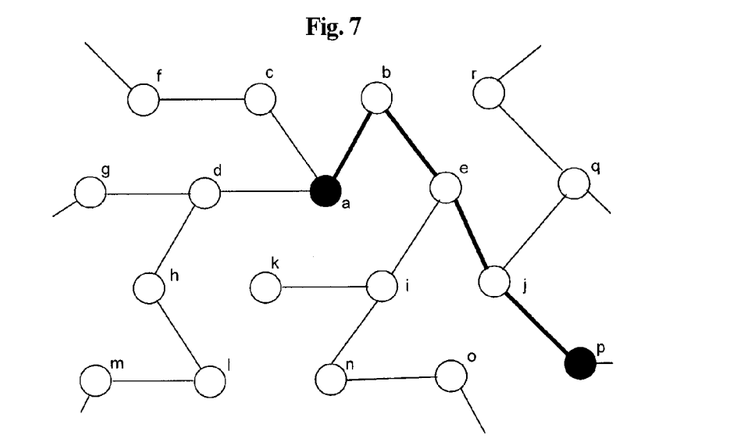
FIG. 7 illustrates the result of a shortest distance search within the online social network search space.

FIG. 7 illustrates the result of a shortest distance search within the online social network search space. This is a case where the user requested a search for the shortest distance between node 'a' corresponding to the user and node 'p' corresponding to another user (a distance having a minimal number of intermediate nodes), with the result that the shortest distance 'a-b-e-j-p' within the social network search space is found and is displayed to the user.

However, in the prior art social network management system, it is possible to establish only 1:1 acquaintance relationships, but it is impossible to establish various relational levels (differences in the extent of the relationship, differences in trust depending on counterpart, the extents of acquaintance relationships, and the like). Accordingly, it is impossible to provide differentiated information according to relational level. Rather, in the case of establishing relationships with untrustworthy counterparts online, there is concern about the leakage of information, so that cases of reluctance to establish a wide online social network have occurred.

Furthermore, in the case of a user who is active and establishes a large network requests, inquiries and favors are concentrated on the user and a large amount of time is consumed, so that the corresponding user escapes from the online social network so as to avoid the above problem, therefore a problem occurs in that the already established online social network around the user collapses.

DISCLOSURE

Technical Problem

Accordingly, the present invention has been made keeping in mind the above problems, and the present invention is intended to provide a system and method for managing a social network online, which provide a specific technical means for enabling various relationship levels to be established, like the real world, in the construction of the online social network thereby diversifying the patterns of online acquaintance relationships.

Furthermore, the present invention is intended to provide a system and method for managing a social network online, which introduce a cost concept to respective search paths in the search via the online social network set a weight for a relationship (ink) between two users (nodes), and provide the optimal of various search paths.

Furthermore, the present invention is intended to provide a system and method for managing a social network online, which determine a weight set for a relationship (link) between two users according to the relationship level between the users, so that the degrees of trustworthiness between users existing on paths are caused to influence the search for an optimal path, thereby promoting the establishment of various relationships with other users at various relationship levels so as to increase opportunities to obtain lower cost paths.

Moreover, the present invention is intended to provide a system and method for managing a social network online, in which many links and nodes are distributed around some users who perform many activities on a network, so that the establishment of multilateral relationships is promoted, unlike the prior art technology in which requests and inquiries are concentrated on a user, thereby achieving the balanced development of the online social network.

Technical Solution

In order to accomplish the above objects, a first aspect of the present invention provides a method of managing a social network, the method being performed by a search server that connects with a plurality of users' terminals via a network and is provided with a user DB and a relationship information DB so that it can record and read data, the method including the step of recording the IDs and corresponding personal information of users who have subscribed to a service via the network, in the user DB; the step of recording corresponding relationships between the users and relationship indices R, reflecting the degrees of trustworthiness of the users having the corresponding relationships, in the relationship information DB; and the path search step of evaluating one or more paths based on the relationship indices R of respective links constituting the paths and providing evaluation results to a first user so that the first user can select an optimal path from among the paths existing between the first user and a second user on the social network constructed with the users used as nodes and the corresponding relationships of the users used as the links.

The step of recording the relationship indices R is performed by determining each of the relationship indices R through designation by one or more of users forming each of the corresponding relationships and recording the relationship index R in the relationship information DB, or includes the step of updating the relationship indices R according to numbers of exchanges, such as transmissions and receptions of messages, between the users having the corresponding relationships.

Preferably, the step of searching for the paths may include the step of calculating and providing required costs of the respective paths by assigning a weight to each of the links in inverse proportion to a relationship index R between two users (nodes) having a corresponding relationship on each of the paths and adding weights of one or more links on the path.

A second aspect of the present invention provides a system for managing a social network, including a user DB for recording IDs and corresponding personal information of users who have subscribed to a service via a network, a relationship information DB for recording corresponding relationships between the users and relationship indices R reflecting degrees of trustworthiness of the users having the corresponding relationships; and a search server for evaluating one or more paths based on the relationship indices R of respective links constituting the paths and providing evaluation results to a first user so that the first user can select an optimal path from among the paths existing between the first user and a second user on the social network constructed with the users used as nodes and the corresponding relationships of the users used as the links.

Advantageous Effects

By applying the present invention, a specific technical means for enabling various relationship levels to be established online, like the real world, is provided, and the patterns of online acquaintance relationships can be more diversified.

By the present invention which introduces a cost concept to respective search path in the search via an online social network a weight is set for a relationship (link) between two users (nodes), and the optimal of various search paths can be provided, thereby increasing the success rate of the establishment of relationships.

Furthermore, by the present invention, a weight set for a relationship link) between two users is determined according to the relationship level between the users, so that the degrees of trustworthiness between users existing on paths are caused to influence the search for an optimal path, thereby promoting the establishment of various relationships with other users at various relationship levels so as to increase opportunities to obtain lower cost paths.

Moreover, by the present invention, many links and nodes are distributed around some users who perform many activities on a network so that the establishment of multilateral relationships is promoted, unlike the prior art technology in which requests and inquiries are concentrated on a user, thereby achieving the balanced development of the online social network.

With reference to the accompanying drawings, preferred embodiments of a method and system for managing a social network are described in detail below.

BEST MODE

Figure 8:
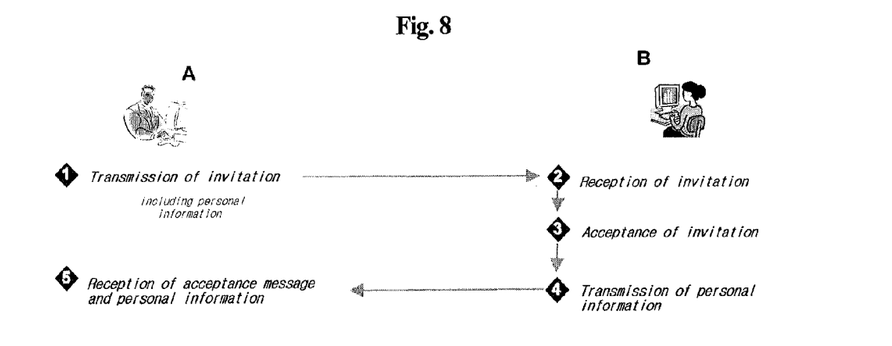
FIG. 8 illustrates a process of establishing a corresponding relationship in a general social network management method.

FIG. 8 illustrates a process of establishing a corresponding relationship in a general social network management method. When user A sends an invitation containing personal information introducing himself or herself via a terminal, user B receives the invitation at his or her terminal via a search server, and sends an acceptance message along with his or her personal information when he or she accepts the invitation.

Figure 9:
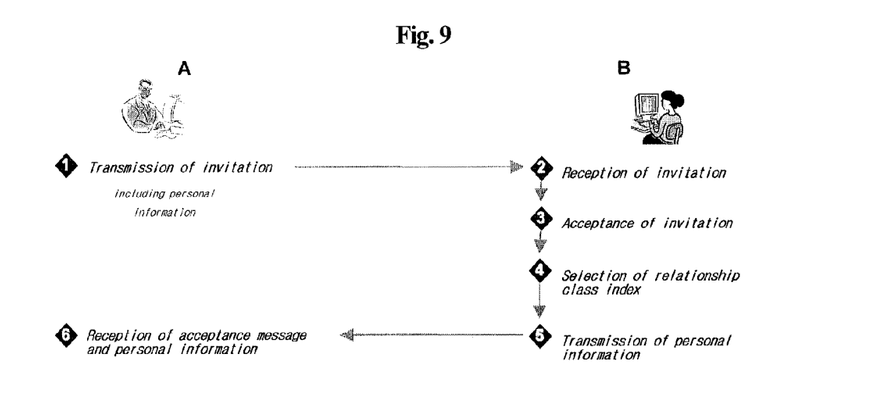
FIG. 9 illustrates a process of establishing a corresponding relationship in a social network management method according to the present invention.

FIG. 9 illustrates a process of establishing a corresponding relationship in a social network management method according to the present invention. The present invention is characterized in that user A, who sends an invitation because he or she wants to establish a corresponding relationship, or user B, who is a recipient, sets a relationship index between the two users, unlike the prior art technology. The relationship index defined in the present invention is a concept corresponding to the degree of proximity, intimacy or trustworthiness between acquaintances in the real world. In the present invention, a relationship index representing the degree of proximity, trustworthiness or intimacy is set between two concerned parties who want to establish a relationship therebetween, and is recorded in a relationship information DB 14.

Figure 10:
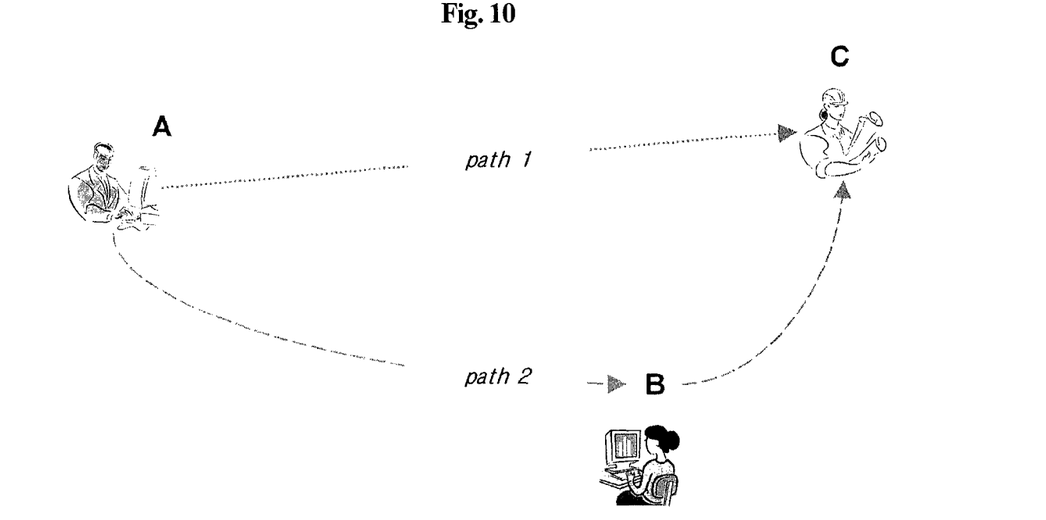
FIG. 10 is a diagram illustrating a plurality of paths that may exist between users who want to establish a corresponding relationship on an online social network.

FIG. 10 is a diagram illustrating a plurality of paths that may exist between users who want to establish a corresponding relationship on an online social network. When user A establishes a corresponding relationship with user C, with whom user A has no direct corresponding relationship on an online social network user A may send an introduction request which requests user B, with whom user A has already established a corresponding relationship, to introduce user C to himself or herself, to user B (path B) although user A may alternatively send an invitation message directly to user C (path 1). This case assumes that a corresponding relationship has already been established between user B and user C and that a corresponding relationship has already been established between user A and user B. In consideration of the situation in the real world, the case where user C is introduced via user B, who is already acquainted with user A, has a stronger possibility of successfully establishing a corresponding relationship between user A and user C than the case where user A sends an invitation message to user C, with whom user A has no acquaintance relationship. Although not shown in FIG. 10, user A may additionally have other paths (for example, user D-user E-user C) that do not pass through user B, on an on-line social network. In the case where a plurality of paths exists as described above, the selection of one from among the paths poses a problem.

The present invention is further characterized by defining relationship indices, which present the degrees of proximity, intimacy or trustworthiness between users, and utilizing them so as to select the optimal path by performing quantitative evaluation on a plurality of paths existing on an online social network and comparing the results. For this purpose, the present invention defines the cost required for each path, as illustrated below.

First, relationship indices may be defined, as illustrated below. For example, when the index of a case where a corresponding relationship has not previously been set between user A and user C is defined as relationship class 0, relationship class 10 is set between user A and user B, who have a relatively high degrees of proximity, intimacy and trustworthiness, and relationship class 7 is set between user B and user C, who have a relatively low degree of proximity, intimacy and/or trustworthiness, weights in inverse proportion to respective relationship classes are assigned to the inks of an online social network corresponding to the respective relationship classes.

In this case, although the weights may be defined in various ways, they may be obtained based on a functional relationship illustrated in FIG. 1. It is assumed that when the relationship index between user i and user j is $R_{ij}$, weight $C(i,j)$ assigned to a link corresponding to a corresponding relationship is inversely proportional to the relationship index. That is, the higher the degree of proximity or intimacy between users having a corresponding relationship, the lower the weight of a corresponding link.

Figure 11:
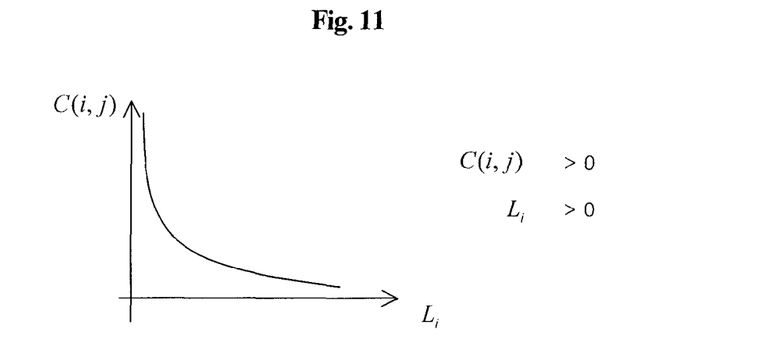
FIGS. 11 and 12 illustrate functional relationships defined between relationship indices R and corresponding link weights (required costs)

When a weight is assigned to each link on an online social network according to a corresponding relationship index, the required cost of a specific path may be defined, in the simplest example, as the sum of weights. For example, if, in FIG. 10, the relationship index between user A and user B is set to 10 and this index corresponds to a weight of 1 when it follows the functional relationship defined as illustrated in FIG. 11, the relationship index between user B and user C is set to 7 and this index corresponds to a weight of 30, and the relationship index between user A and user C, who do not know each other at all, is set to 0, and this index corresponds to a weight of 100, the required cost of a path is 100 when path 1 is selected, and the required cost of a path is 31 when path 2 is selected, in the case of FIG. 10. As a result, by calculating relationship indices and the required costs of paths, the quantitative relative comparison of the respective paths is enabled, so that user A can select the path most appropriate for himself or herself.

A modification, in which a reserve is assigned to each user and recorded in the user DB when necessary, the required cost of a path is subtracted from the reserve, and the reserve is updated when the path is selected from among the respective paths, is possible. In this case, different reserves can be assigned according to user, or the reserve can increase in proportion to a user's activity or purchases on a network. That is, a user who selects an optimal path having the lowest required cost can enjoy a benefit in that the cost subtracted from the reserve is small. The reserve may have the form of typical cyber money that is assigned to a user who subscribes to a certain Internet service. In the above example, user B, who sent the introduction message to user C, is paid part of the required cost of a path that user A must pay as an incentive when user C accepts a request for the introduction and a corresponding relationship is established between user C and user A.

Figure 12:
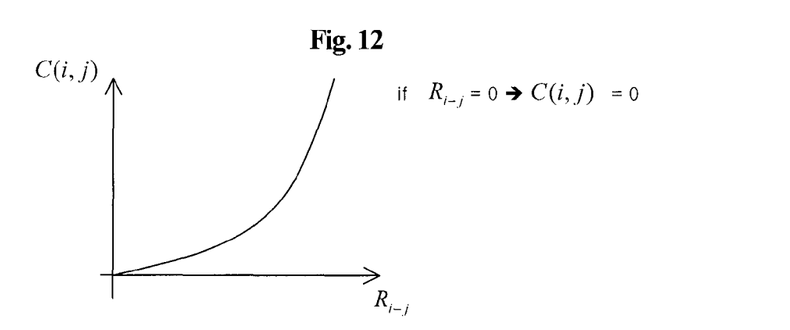

In the above case, the illustrated method of calculating the required cost of a path may be modified in various ways. For example, as in the functional relationship illustrated in FIG. 12, user i may be caused to input a relationship index that is desired by user i to be established with user j, and a required cost varies according to the size of the index. The example illustrated in FIG. 12 has a form in which, when user i wants a high relationship index, that is, a high degree of trustworthiness, the cost that must be paid increases. Since the method and equation for calculating the required cost of a path may be modified in various ways, it must be appreciated that the above-described method is only an example.

Figure 13:
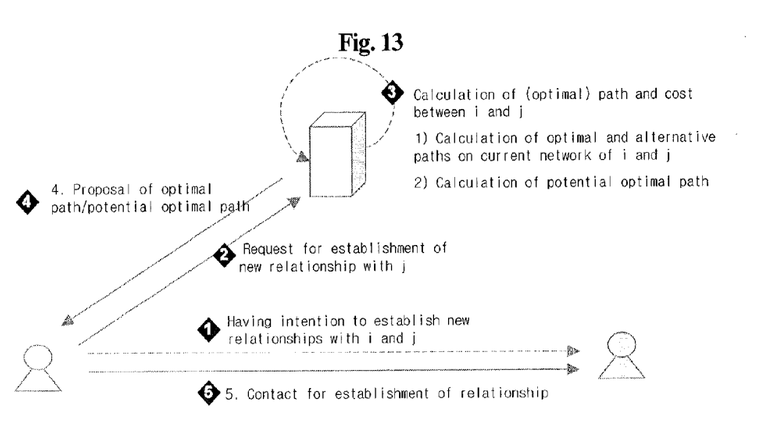
FIG. 13 is a diagram schematically illustrating a process of obtaining an optimal path according to the calculated cost of a path and presenting the optimal path to a user according to the present invention.

FIG. 13 is a diagram schematically illustrating a process of obtaining an optimal path according to the cost of a path calculated as described above and presenting the optimal path to a user according to the present invention. First, user i accesses the search server, requests the establishment of a new relationship with user j, and requests a search for an optimal path. At this time, user j may be a user designated by user i, or a user who is found in the search server in such a way that user i inputs a specific condition (for example, a patent attorney who is a relative within the fourth degree and resides in Seoul) and searches the search server.

For the above-described request, the search server searches for all possible paths existing between user i and user j on the online social network, calculates the required costs of the paths, and presents one or more paths, including the path having the lowest cost, to the user. In this case, the search server may obtain a potential optimal path and present the path to a user, such a potential optimal path being described in detail below. Through the path presented as described above, user i makes contact with user j to establish a corresponding relationship (for example, a request for the transmission of an introduction message to another user on the path).

The above-described potential optimal path refers to a path that passes through one of some other users having no corresponding relationship with user i and that can be more effective in achieving the goal of the establishment of a corresponding relationship with user j when the corresponding relationship is established. That is, this refers to an instance in which the case of establishing a new relationship with user k and accessing user j therethough is inexpensive when the cost of an optimal path based on relationships between users that have been previously established and recorded in the relationship information DB is somewhat high. For example, when user k having a considerably high relationship index with respect to user j, exists, the case where user i first establishes a relationship with user k and requests user j to introduce him or her via user k although user k does not at that time have a corresponding relationship with user i can reduce the required cost of the path, which is frequently the case in the real world.

Figure 14:
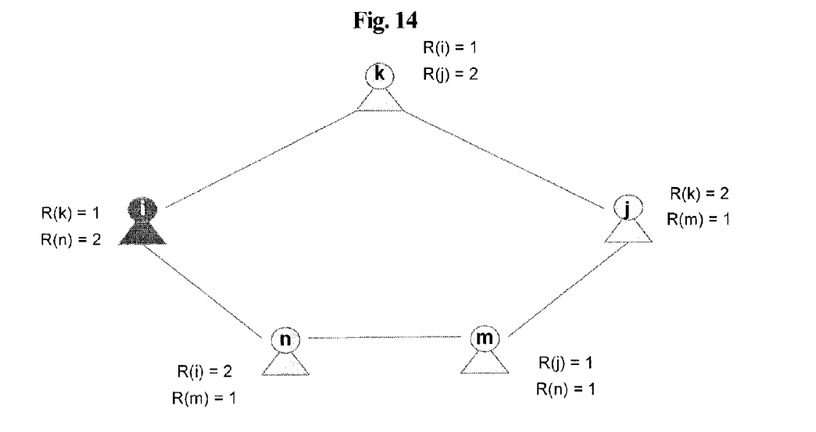
FIGS. 14 and 15 illustrate the path evaluation results of the search server for a certain number of users on an online social network.
Figure 15:
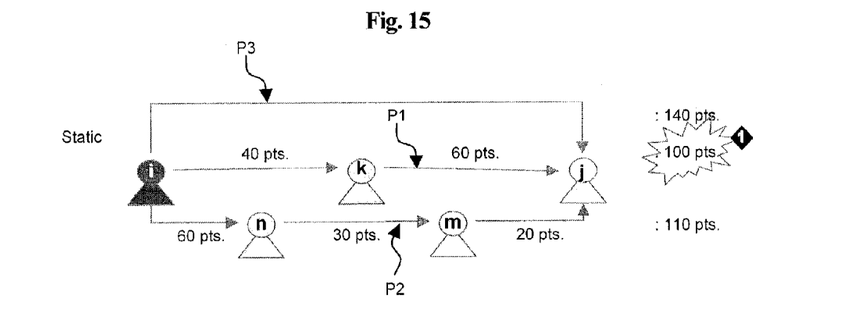

FIGS. 14 and 15 illustrate the path evaluation results of the search server for a certain number of users on an online social network. It is assumed that corresponding relationships illustrated in FIG. 14 are defined in the user DB for users i, j, k, m, and n registered in the relationship information DB, and relationship indices are defined for the respective corresponding relationship as illustrated in FIG. 14 (for example, the relationship index between user i and user n is defined as 2, and the relationship index between user n and user m is defined as 1). In this case, when user i requests the search server to search for a path for the establishment of a corresponding relationship with user j, the search server assigns a weight (for example, the weight between user i and user k is 40) to each link according to relationship index R, as illustrated in FIG. 15.

Figure 16:
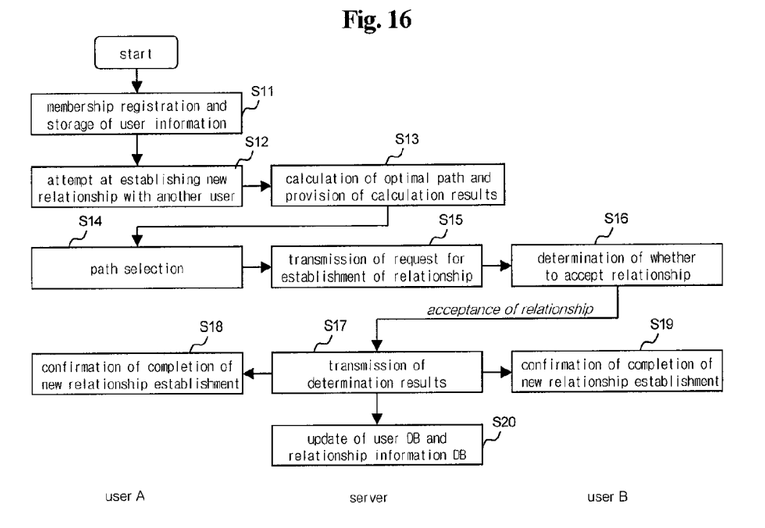
FIG. 16 illustrates the flow of an embodiment of the social network management method according to the present invention.

According to the method of calculating the required cost of a path by adding all of the weights of the corresponding path, a cost of 140 points is defined for the case of directly requesting the establishment of a corresponding relationship, the cost of a path required for the establishment of a corresponding relationship via user k is 100 points, and the cost of a path required for the establishment of a corresponding relationship via user n and user m is 110 points, so that the path having the lowest required cost is a path through user k-FIG. 16 illustrates the flow of an embodiment of the social network management method according to the present invention. Information about the membership registrations of users and user information is stored in the user DB at step S11. When the registered user requests the search server to establish a new relationship with another user at step S12, the search server calculates an optical path and provides results at step S13. The user selects one from among provided paths at step S14. When users existing on the path transmit requests for the establishment of relationships to a target user at step S15, the target user determines whether to accept the relationship at step S16. The search server transmits relationship acceptance results to both users at steps S18 and S19, and the updated reserve and new corresponding relationship information are respectively recorded in the user DB and the relationship information DB at step S20.

Figure 17:
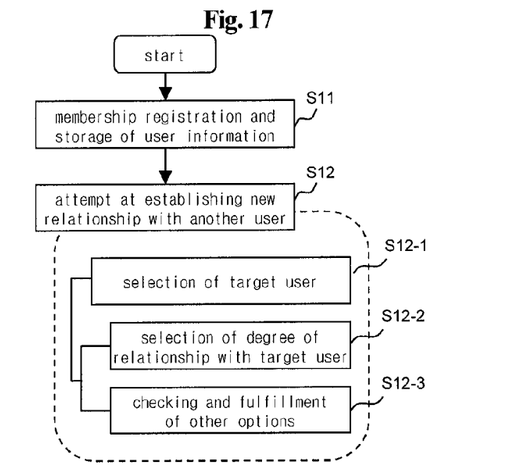
FIG. 17 illustrates information that is input by the user to transmit a request for establishment of a new relationship with another user.

FIG. 17 illustrates information that is input by the user to transmit a request for the establishment of a new relationship with another user. First, the user selects a target at step S12-1, selects the degree of relationship (relationship index) desired to be established with the target at step S12-2, and inputs other necessary items at step S12-3. In this case, the target may be, for example, a person who has posted a specific message on the message board of a community or an association of like-minded persons, the co-recipient/CC of information/content provided to user A, or a user that has been known during communication with another user. The degree of relationship may be set according to a difference in relationship that is desired to be established with a corresponding user, and the extent of disclosure of information may be limited accordingly. As other necessary items, an incentive to be borne by user A at the time of establishing a relationship may be presented, or his or her personal inform on may be input. The necessary items may be items, such as an upper limit for the required cost of a path (XX points or below), limitation on the degree of kinship (for example, within the fifth degree), the provision of a potential optimal path, and limitation on the number of paths, which correspond to options at the time of searching for a path at the server.

Figure 18:
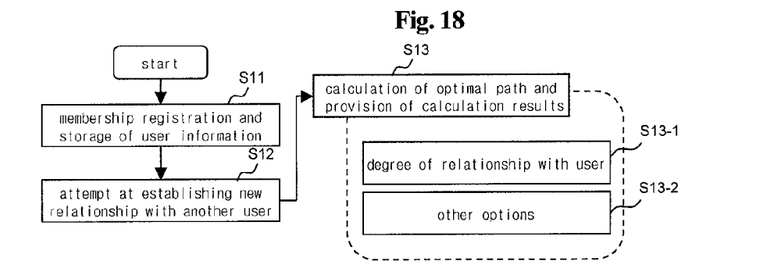
FIG. 18 illustrates items that are reflected at the time of searching for an optimal path.

FIG. 18 illustrates items that are reflected at the time of searching for an optimal path. As described above, the degree of relationship between users (relationship index) is taken into account at step S13-1. With respect to other option items, the remaining reserve of a user who has requested a search is checked with reference to the user DB and is taken into account, so that found paths may be presented only when the required cost of each path is lower than the remaining reserve, or a message providing notification of the insufficient reserve may be transmitted at step S13-2.

Figure 19:
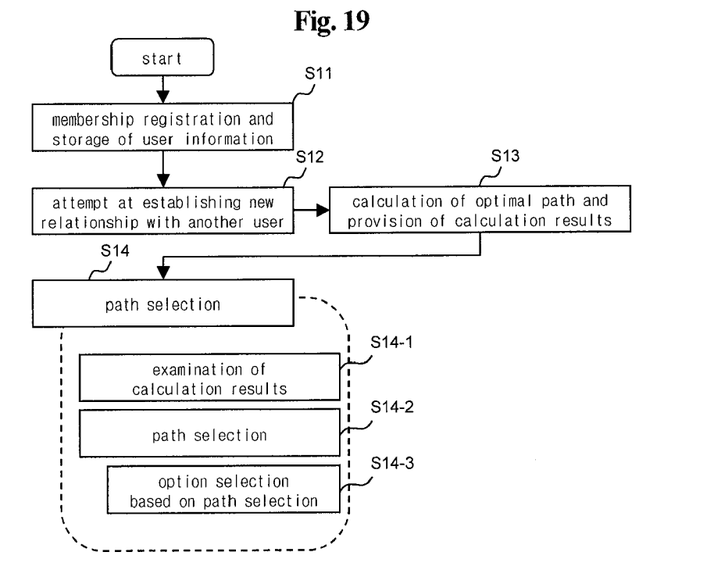
FIG. 19 illustrates items that are generally taken into account at step S14, at which the user selects a path.

FIG. 19 illustrates items that are generally taken into account at step S14, at which the user selects a path. First, the user examines calculation results for the provided required costs of paths at step S14-l, selects one from among provided paths at step S14-2, and selects option items for the selected path at step S14-3. In this case, the option items may be request phrases, demands on a counterpart user, and incentives accompanying requests.

Figure 20:
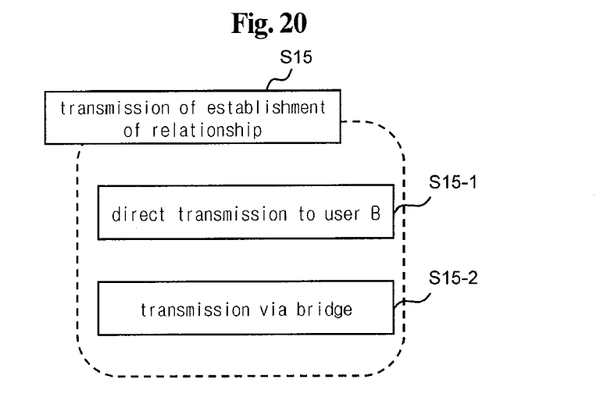
FIG. 20 illustrates items that are taken into account at the step of transferring a message requesting the establishment of a relationship at the server.

FIG. 20 illustrates items that are taken into account at the step of transferring a message requesting the establishment of a relationship at the server. Depending on the path selected by user A, the message may be transferred directly to user B at step S15-1, or may be transferred via another user (bridge) at step S15-2. In this case, when the message is transferred via another user at step S15-2, whether the other user accepts the role of introducer may be inquired about. If the other user accepts the role, user B may be caused to transmit a new message with the introduction and recommendation of user A added thereto. In this case, a predetermined incentive may be granted to user B, and the incentive is part of the required cost of the path and may be subtracted from the reserve of user A or B.

Figure 21:
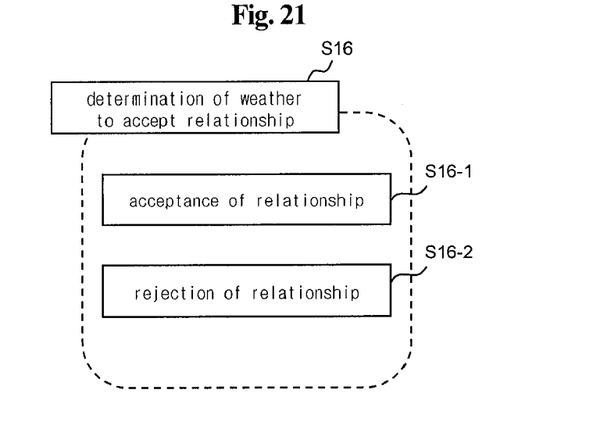
FIG. 21 illustrates items that are taken into account by user B to determine the acceptance of a request for establishment of a relationship with respect to a transmitted message requesting the establishment of the relationship.

FIG. 21 illustrates items that are taken into account by user B to determine whether to accept a request for the establishment of a relationship with respect to a transmitted message requesting the relationship. User B may accept the request for the relationship at step S16-1, or may reject the request at step S16-2. The rejection by user B may be performed at various levels. Various options, such as complete rejection and subsequent relationship request blocking, the rejection only of the present request for a relationship, conditional rejection (user B inputs an additional request item for user A, such as the adjustment of the relationship index), the deferment of determination of acceptance, or discarding of the relationship request message, may be presented to user B, and the server may temporarily store or delete a corresponding relationship request message.

Figure 22:
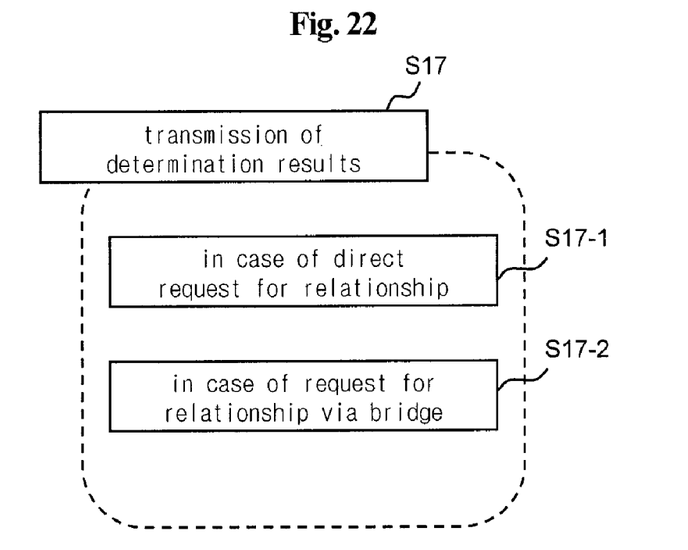
FIG. 22 illustrates a step of transferring a relationship acceptance message that is performed at the server.

FIG. 22 illustrates a step of transferring a relationship acceptance message that is performed at the server. In the case of a direct relationship request at step S17-1, users A and B are notified of the establishment of a new relationship, and notification of the extent of mutual information disclosure or the subtraction of the required cost of a path from a reserve is provided. In the case of the establishment of a relationship via another user at step S17-2, concerned persons including the other user are notified of the establishment of a relationship, the settlement of a reserve based on the required cost of a path is performed, and notification of settlement results is provided.

Figure 23:
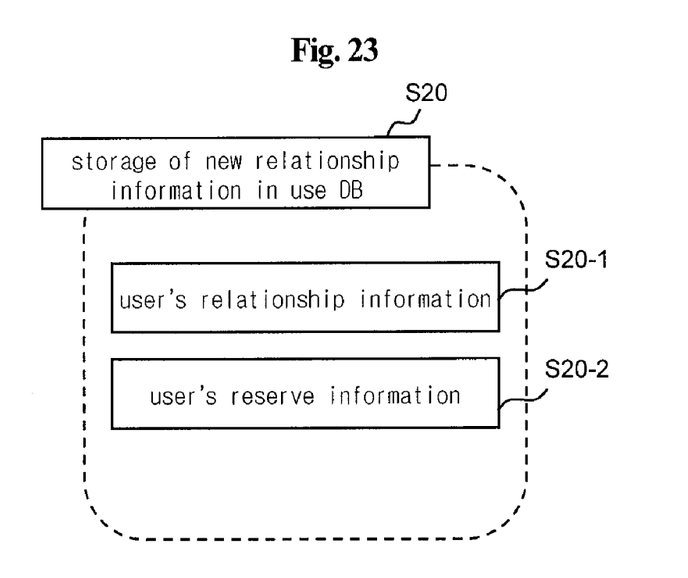
FIG. 23 illustrates items that are taken into account at the step of updating the DBs performed at the server.

FIG. 23 illustrates items that are taken into account at the step of updating the DBs performed at the server. The server performs subtraction from a reserve recorded in the user DB according to settlement details and updates the reserve at step S20-2, and records the establishment of a new corresponding relationship in the relationship information DB at step S20-1.

Figure 24:
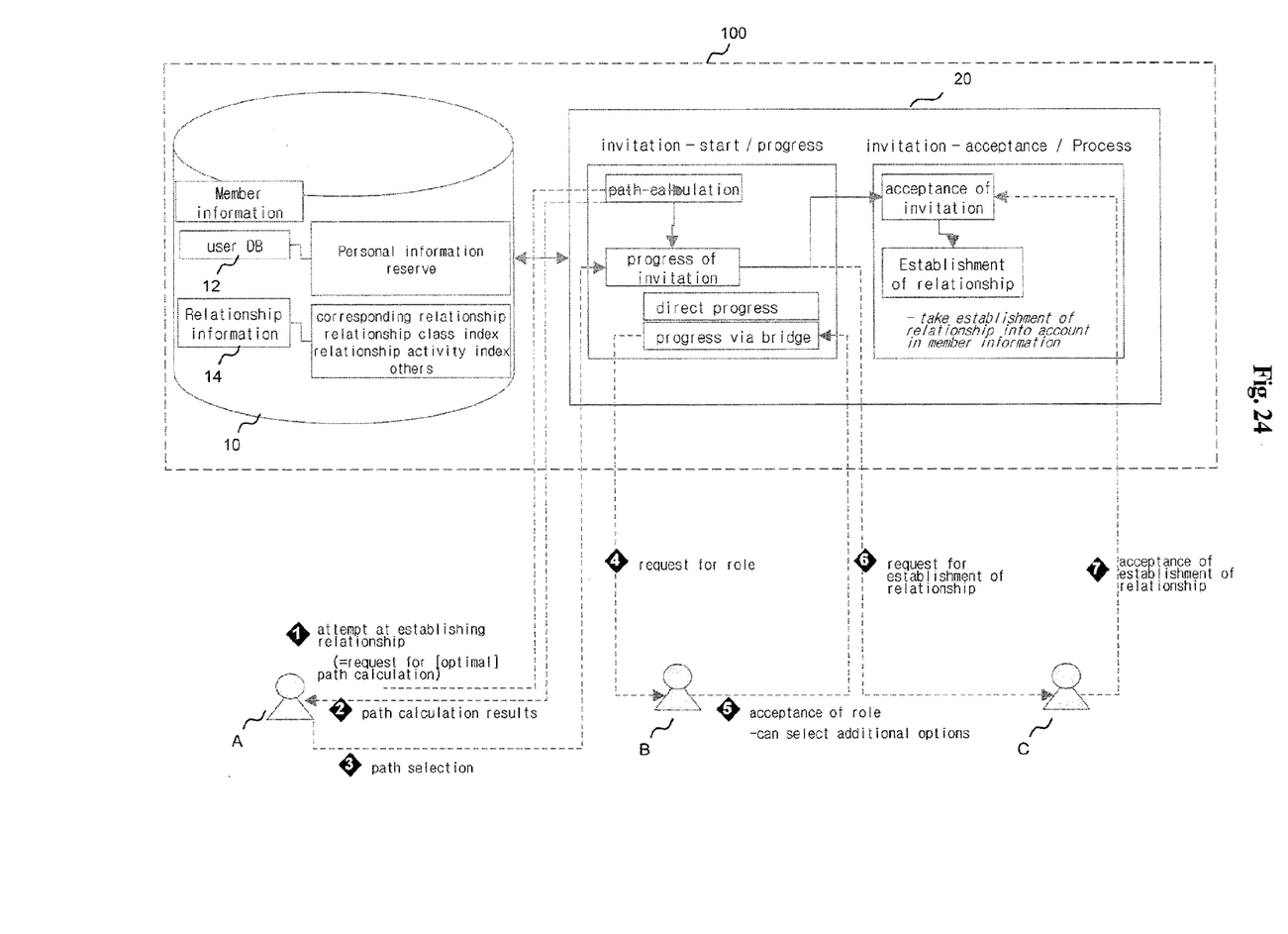
FIG. 24 illustrates the construction and data processing procedure of an embodiment of an online social network management system 100 according to the present invention.

FIG. 24 illustrates the construction and data processing procedure of an embodiment of an online social network management system 100 according to the present invention. A search server 20 constructs and manages a user DB 12 and a relationship information DB 14 in a database 10. In the user DB 12, users' IDs, personal information, and assigned reserves may be recorded. Meanwhile, in the relationship information DB 14, corresponding relationships (acquaintance relationships) between users, relationship indices between the users, and relationship activity indices, indicating the exchange of information between the users or the number of data transmissions and receptions between the users, may be recorded.

The search server 20 basically performs a function of searching the online social network for a user meeting specific conditions and providing search results to a user who has requested the search Additionally, the search server 20 calculates the required costs of respective paths taking into account relationship indices described above, and enables the required costs to be compared for respective paths. User A, desiring to establish a new relationship with user C, can select an optimal path based on the required costs of paths provided by the search server 20, and can transmit a relationship establishment request message directly or via another user (that is, a bridge; user B in the illustrated drawing). When the intermediate user B accepts the role of introduction path, a message requesting the establishment of a relationship is transmitted to user C. When user C accepts the establishment of the relationship, the search server 20 updates the user DB 12 and the relationship information DB 14 by updating the reserves and the corresponding relationship information based on the establishment of the new relationship.

The user terminals in the social network management system 100 of the present invention may be various fixed or mobile terminals, such as laptops, desktops, PDAs, and PCSs.

[Mode For Invention]

Part or all of the technical concept of the present invention may be implemented in various forms, such as hardware, software and a recording medium storing the technology. Although the present invention has been described only in conjunction with the preferred embodiments, the present invention is not limited to the above-described specific embodiments. Those skilled in the art to which the present invention belongs can make various modifications without departing from the gist of the present invention set forth in the claims, and such modifications fall within the range of descriptions of the attached claims.

[Industrial Applicability]

Using the present invention, a specific technical means for enabling various relationship levels to be set online, as in the actual world, is provided, and online acquaintance relationship patterns can be further diversified.

The invention claimed is:

1. A computer-implemented method of managing a social network, the method comprising:
   receiving a request from a first user to establish a connection with a second user via a network;
   calculating, in response to the request, costs of one or more paths based on a relationship index with the second user for searching for an optimal path, wherein the cost of each of the one or more paths is calculated by assigning a weight value to each of the one or more paths in an inverse proportion to the relationship index between the first user and the second user; and
   selectively providing one or more paths according to the calculation for the optimal connection between the first user and the second user, wherein the optimal path comprises a path using an intermediate user of the social network, and the path is generated associated with an incentive granted to the intermediate user by subtracting the calculated costs from the first user, the second user, or both of the first user and the second user, wherein the selectively providing further comprises establishing at least one path according to the calculated costs of the one or more paths via one or more intermediate users.

2. The method of claim 1, wherein the relationship index is determined based upon a respective direct connection path and indirect connection paths between the first user and the second user.

3. The method of claim 1, further comprising:
   updating the relationship index and the weight value based on an optimal path associated with an successful connection established with the provided one or more paths.

4. The method of claim 1, further comprising:
   charging a cost for the connection, wherein the cost is determined based on the selected path and each connection of the selected path.

5. The method of claim 4, further comprising:
   displaying cost information for each of the provided paths for selecting the optimum path between the first user and the second user.

6. The method of claim 5, wherein the cost information is proportional to the relationship index between the first user and the second user.

7. The method of claim 1, further comprising:
   searching, in response to the request by the first user, for the second user based on a searching condition provided by the second user.

8. The method of claim 1, further comprising:
   searching for the second user based on predetermined searching criteria.

9. The method of claim 1, further comprising:
   requesting at least one intermediate user to function as a bridge for establishing the connection between the first user and the second user.

10. The method of claim 1, wherein information shared between the first user and the second user is limited based on the relationship index.

11. A non-transitory computer-readable recording medium comprising a computer executable program, which when executed, performs the method of claim 1.

12. The method of claim 1, further comprising:
   generating a first relationship index for the connection between the first user and the second user based on the selected path; and
   storing the first relationship index.

13. The method of claim 1, further comprising:
   providing the one or more intermediate users with a credit in response to the selection via the one or more intermediate users for the connection between the first user and the second user.

14. The method of claim 1, further comprising:
   assigning a cost to the weight value to each connection of the one or more paths, and comparing the assigned cost of each connection of the one or more paths, wherein the cost is determined by a sum of the weight value of each connection path selected by the first user.

15. The method of claim 1, further comprising:
   generating a user interface for providing an option items corresponding to the one or more paths associated with the searched optimal path, the option items comprising request phrases, demands on a counter-part user, and the incentive granted to the intermediate user, the incentive being part of the calculated costs required for the optimal path.

16. A system for managing a social network, the system comprising:
a database to store a relationship index, an identification and a personal information of a subscriber to a service via a network, the relationship index being determined according to a level of trustworthiness between the subscribers; and
a search server configured to calculate costs of one or more paths between the subscribers and selectively to provide an optimal connection, wherein the cost of each of the one or more paths is calculated by assigning a weight to each connection path of the one or more paths in an inverse proportion to the relationship index between the subscribers, wherein the optimal connection comprises at least one path using at least one intermediate subscriber, and the at least one path is generated associated with an incentive granted to the intermediate subscriber by subtracting the calculated cost from one or more of the subscribers, wherein the at least one path is generated according to the calculated costs of the one or more paths via the at least one intermediate subscriber.

17. The system of claim 16, further comprising:
a user interface is configured to provide an option items corresponding to the one or more paths associated with the searched optimal path, the option items comprising request phrases, demands on a counter-part subscriber, and the incentive granted to the intermediate subscriber, the incentive being part of the calculated costs required for the optimal connection.

* * * * *